US008958087B2

(12) United States Patent
Tsutsumi

(10) Patent No.: US 8,958,087 B2
(45) Date of Patent: Feb. 17, 2015

(54) IMAGE PROCESSING SYSTEM AND IMAGE PROCESSING APPARATUS

(71) Applicant: KYOCERA Document Solutions Inc., Osaka (JP)

(72) Inventor: Masafumi Tsutsumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/226,134

(22) Filed: Mar. 26, 2014

(65) Prior Publication Data
US 2014/0293342 A1    Oct. 2, 2014

(30) Foreign Application Priority Data
Apr. 1, 2013    (JP) .................... 2013-075712

(51) Int. Cl.
*G06F 3/12*    (2006.01)
(52) U.S. Cl.
CPC ............ *G06F 3/1229* (2013.01); *G06F 3/1221* (2013.01); *G06F 3/1286* (2013.01)
USPC .................... 358/1.13; 358/1.15; 713/323
(58) Field of Classification Search
CPC ........ Y02B 60/41; Y02B 60/34; Y02B 60/46; H04N 1/00896; H04N 1/00885; G06F 1/3203; G06F 1/3293; G06F 3/1221; G06F 1/3287
USPC .................... 713/323; 358/1.4, 1.151
See application file for complete search history.

(56) References Cited

U.S. PATENT DOCUMENTS

| 8,495,393 | B2* | 7/2013 | Oh et al. ................ 713/300 |
| 2006/0101109 | A1* | 5/2006 | Nishio ................ 709/200 |
| 2007/0240004 | A1* | 10/2007 | Maeda ................ 713/322 |
| 2008/0091736 | A1* | 4/2008 | Sawayanagi et al. ......... 707/200 |
| 2009/0244588 | A1* | 10/2009 | Kuroishi et al. ............. 358/1.14 |
| 2010/0205471 | A1* | 8/2010 | Vavilala et al. ............. 713/340 |
| 2010/0235619 | A1* | 9/2010 | Inoue ................ 713/151 |
| 2011/0194133 | A1* | 8/2011 | Fujisawa ................ 358/1.13 |
| 2012/0236347 | A1* | 9/2012 | Umeda ................ 358/1.13 |
| 2012/0246502 | A1* | 9/2012 | Koga ................ 713/323 |
| 2014/0146345 | A1* | 5/2014 | Fujisawa, Minoru ........ 358/1.14 |

FOREIGN PATENT DOCUMENTS

JP    2011-086144    4/2011

* cited by examiner

*Primary Examiner* — Dennis Dicker
(74) *Attorney, Agent, or Firm* — Wenderoth, Lind, Ponack, L.L.P.

(57) ABSTRACT

An image processing apparatus and a network relay device are configured to be communicable with each other by communication means in which power consumption is smaller than that in a network controller connected to a wired LAN. A control unit of the image processing apparatus, while switching a first power saving mode to a second power saving mode in which power consumption is smaller by stopping power supply to the network controller, starts power supply to the network controller to switch the second power saving mode to a normal mode when a return notification is sent via the communication means.

5 Claims, 5 Drawing Sheets

IMAGE PROCESSING SYSTEM AND IMAGE PROCESSING APPARATUS

CROSS-REFERENCE TO RELATED APPLICATION

This application is based upon and claims the benefit of priority from Japanese Patent Application (s) No. 2013-075712 filed on Apr. 1, 2013, the entire contents of which are incorporated herein by reference.

BACKGROUND

The present invention relates to an image processing system having a network relay device and an image processing apparatus.

A plurality of image processing apparatuses and personal computers (hereinafter referred to as "PCs") constituting an image processing system are generally connected, via a LAN cable, to a network relay device such as a hub device. That is, each of the network relay device, the image processing apparatuses, and the PCs has a network controller, and the LAN cable is connected to each network controller.

Further, typically, the image processing apparatus has a normal mode in which, for example, image processing functions such as printing and scanning can be executed and a power saving mode in which power consumption is smaller than that in the normal mode. In the power saving mode, power supply to some devices in the image processing apparatus (for example, a print engine, a CPU, an HDD, and a DRAM) is turned off or some devices are set to a sleep state, and thereby, power consumption can be kept smaller than that in the normal mode.

For example, an image processing apparatus is proposed in which when data requests predetermined processing other than image processing, a network relay device having received the data addressed to the image processing apparatus in the power saving mode performs proxy response processing, and when the data requests image processing, the network relay device returns the image processing apparatus from the power saving mode to the normal mode.

SUMMARY

An image processing system according to an aspect of the present disclosure is provided with a network relay device and an image processing apparatus having a network controller connected to the network relay device via a wired LAN. The image processing apparatus has a control unit. The control unit executes control of switching operation modes among a normal mode, a first power saving mode, and a second power saving mode. The normal mode is a mode in which an image processing function can be executed. The first power saving mode is a mode in which power consumption is smaller than that in the normal mode. The second power saving mode is a mode in which power consumption is smaller than that in the first power saving mode. The network relay device has a proxy response unit. When receiving first data requesting the image processing apparatus to perform image processing, in a case where an operation mode of the image processing apparatus is the first power saving mode or the second power saving mode, the proxy response unit transfers the first data to the image processing apparatus. On the other hand, when receiving second data requesting processing other than the image processing, the proxy response unit executes predetermined processing corresponding to the second data as a proxy for the image processing apparatus. The image processing apparatus and the network relay device are configured to be communicable with each other by communication means in which power consumption is smaller than that in the network controller of the image processing apparatus. The proxy response unit is configured to send a return notification to the image processing apparatus via the communication means before when receiving the first data in a case where the operation mode of the image processing apparatus is the second power saving mode, transferring the first data to the image processing apparatus. The control unit is configured to switch the first power saving mode to the second power saving mode by stopping power supply to the network controller of the image processing apparatus, and to start power supply to the network controller of the image processing apparatus to switch the second power saving mode to the normal mode when the return notification is sent.

An image processing apparatus according to an aspect of the present disclosure is provided with a network controller connected to the network relay device via a wired LAN. The image processing apparatus has a control unit. The control unit performs control of switching an operation mode among a normal mode in which an image processing function can be executed, a first power saving mode in which power consumption is smaller than that in the normal mode, and a second power saving mode in which power consumption is smaller than that in the first power saving mode. The image processing apparatus is configured to be communicable with the network relay device by communication means in which power consumption is smaller than that in the network controller. The network relay device has a proxy response unit that, while transferring first data to the image processing apparatus when receiving the first data requesting the image processing apparatus to perform image processing, in a case where an operation mode of the image processing apparatus is the first power saving mode or the second power saving mode, executes predetermined processing corresponding to second data as a proxy for the image processing apparatus when receiving the second data requesting processing other than the image processing. The proxy response unit is configured to send a return notification to the image processing apparatus via the communication means before transferring the first data to the image processing apparatus when receiving the first data in a case where an operation mode of the image processing apparatus is the second power saving mode. And the control unit is configured to, while switching the first power saving mode to the second power saving mode by stopping power supply to the network controller of the image processing apparatus, start power supply to the network controller of the image processing apparatus to switch the second power saving mode to the normal mode when the return notification is sent.

DETAILED DESCRIPTION

Hereinafter, an embodiment will be described in detail with reference to the drawings. It is noted that an art of the present disclosure is not limited to the following embodiment.

Figure 1:
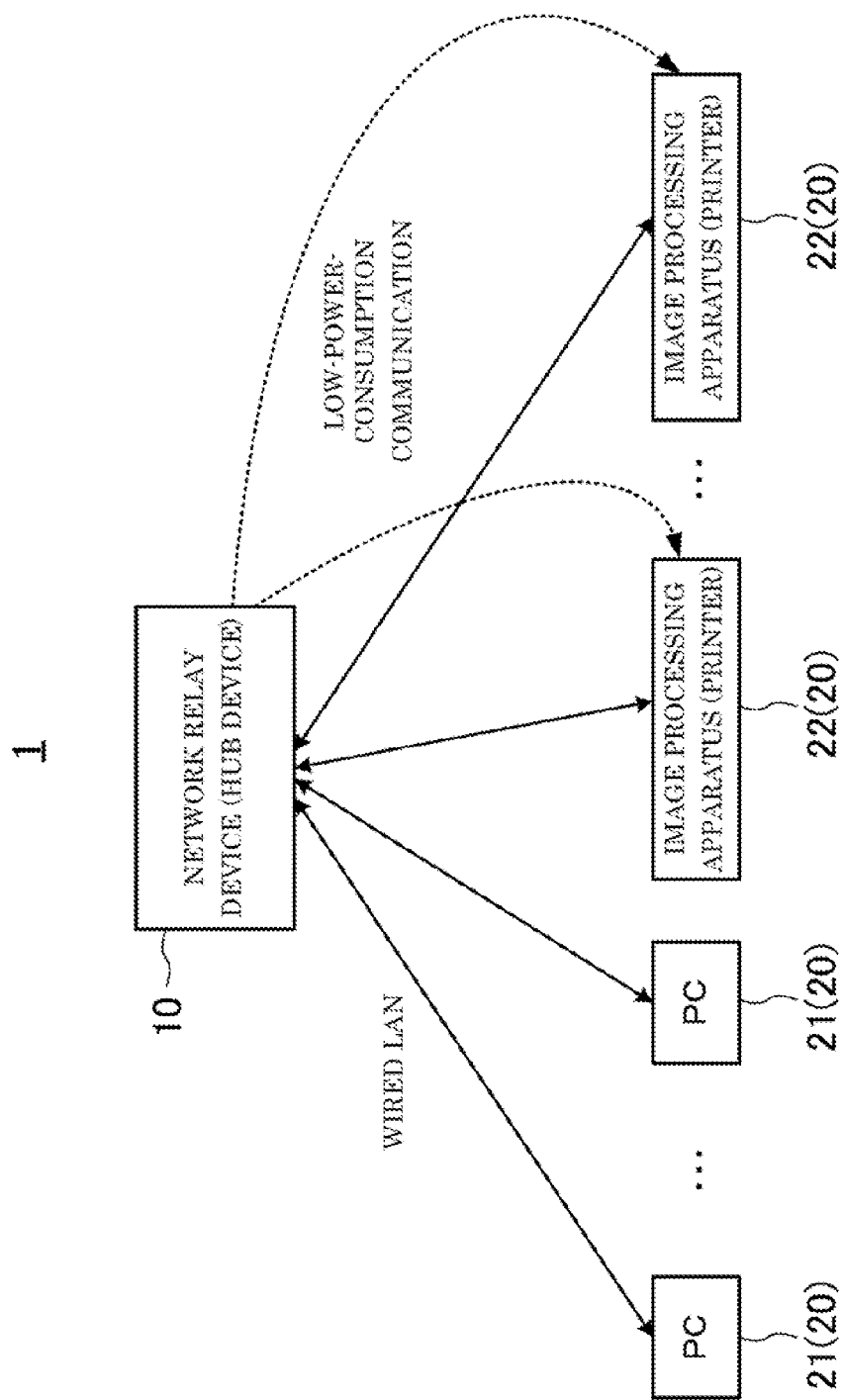
FIG. 1 is a conceptual diagram showing a schematic configuration of an image processing system in the present embodiment.
Figure 2:
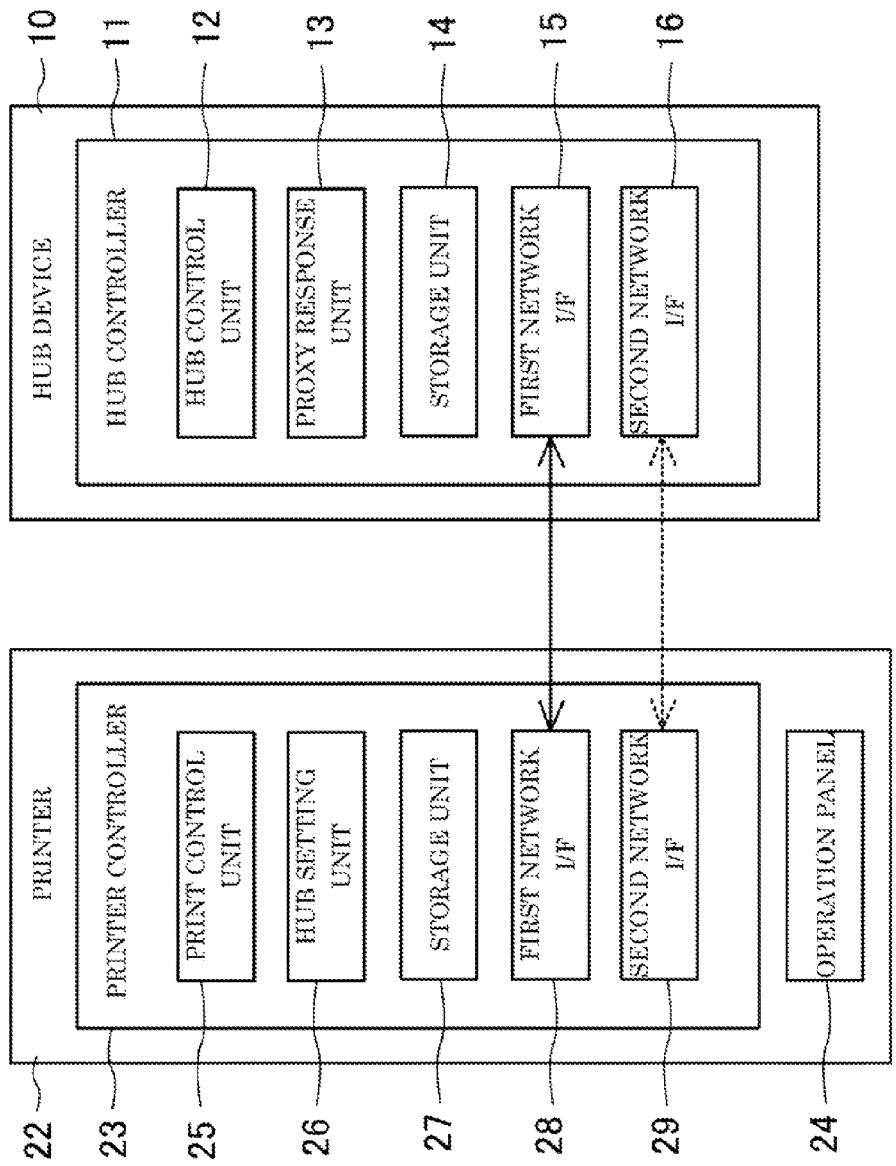
FIG. 2 is a block diagram showing a schematic configuration of an image processing system in the present embodiment.

Each of FIG. 1 and FIG. 2 shows a schematic configuration of an image processing system 1 in the present embodiment. It is noted that, in FIG. 2, one printer 22 is illustrated as a representative, and illustration of another printer 22 is omitted.

As shown in FIG. 1, the image processing system 1 has a hub device 10 as a network relay device, and a plurality of network devices 20 connected to the hub device 10 via a wired LAN. The network relay device is not limited to a hub device, but may be another network relay device such as a router, for example.

In the present embodiment, a plurality of PCs 21 and a plurality of image processing apparatuses 22 as the network devices 20 are connected to the hub device 10. Further, in the present embodiment, a description will be given for an example in which each of the image processing apparatuses 22 is a printer.

It is noted that the image processing apparatus 22 may be, for example, a scanner, a copier, or a multifunction peripheral in addition to the printer. Further, the network device 20 may be, for example, another network apparatus such as a server. Furthermore, the image processing system 1 may have a plurality of hub devices 10.

The hub device 10 includes, for example, a hub controller 11 as shown in FIG. 2. The hub controller 11 has, for example, a hub control unit 12, a proxy response unit 13, a storage unit 14 as well as a first network I/F 15 and a second network I/F 16 as a network controller.

On the other hand, the printer 22 is provided with, for example, a printer controller 23 and an operation panel 24 as shown in FIG. 2. The printer controller 23 has, for example, a print control unit 25, a hub setting unit 26, a storage unit 27 as well as a first network I/F 28 and a second network I/F 29 as a network controller.

On end of a LAN cable is connected to the first network I/F 28 of the printer 22. On the other hand, another end of the LAN cable is connected to the first network I/F 15 of the hub device 10. Thereby, the printer 22 is connected to the hub device 10 via a wired LAN and configured to execute printing on the basis of a print request received from PC and the like via the hub device 10.

The first network I/F 28 of the printer 22 is a unit that communicates with a device on a network. The first network I/F 28 is, for example, a NIC (Network Interface Card) that performs communication by the Ethernet (registered trademark) and has one port, a PHY (Physical layer), a MAC (Media Access Controller), a receive buffer, and a transmit buffer.

The first network I/F 15 of the hub device 10 is a unit that transmits (transfers) data received from a device on a network to another device. The first network I/F 15 is a unit that performs switching by, for example, the Ethernet (registered trademark) and has a plurality of ports, a PHY, a MAC, a receive buffer, a transmit buffer, and a switching IC (Integrated Circuit).

Further, the printer 22 and the hub device 10 are configured to be communicable with each other by the second network I/F 16 and the second network I/F 29 as communication means in which power consumption is smaller than that in the first network I/F 28 of the printer 22. As the communication means, it is possible to apply, for example, wireless communication means such as the Zigbee (registered trademark) or the Bluetooth (registered trademark) and wired serial communication means. Further, types of communication means may be switched according to a distance between the printer 22 and the hub device 10.

For example, for the hub device 10 and the printer 22 that are in a short distance from each other, the second network I/F 16 and the second network I/F 29 can be connected by a serial cable; for the hub device 10 and the printer 22 that are in a medium distance from each other, the second network I/F 16 and the second network I/F 29 can be configured to be communicable by wireless communication such as the Zigbee (registered trademark) with a relatively short communication distance; and regarding the hub device 10 and the printer 22 that are in a long distance from each other, the second network I/F 16 and the second network I/F 29 can be configured to be communicable by wireless communication such as the Bluetooth (registered trademark) with a relatively long communication distance.

The operation panel 24 is provided in the printer 22 as an input/output interface between a user and the printer 22. The operation panel 24 has, for example, a display such as a Liquid Crystal Display and an Organic EL Display (Organic Electro-Luminescence Display), a touch panel, and a hard switch.

The storage unit 27 is configured to store data such as print data, various types of setting values related to printing or a network protocol, a program, and the like. The storage unit 27 may be configured by a memory device and a hard disk drive.

In the storage unit 27, a proxy response program is stored in advance. The proxy response program is a program that realizes some functions of the print control unit 25 and a program that is executable in the hub device 10. The proxy response program in the present embodiment executes, in the hub device 10, a change of the various types of setting values related to printing or the network protocol and a response of a status related to printing or the network protocol.

The hub setting unit 26 sets a proxy response function of the hub device 10 connected to the printer 22. The proxy response function, which will be described below in detail, indicates a function of the hub device 10 that executes some functions of the printer 22, in place of the printer 22.

Specifically, in a case where the hub setting unit 26 detects that the first network I/F 28 is connected to the network via the LAN cable, when the proxy response program is not installed in the hub device 10, the hub setting unit 26 reads out the proxy response program and the various setting values related to printing or the network protocol from the storage unit 27 and transmits the program and the setting values to the hub device 10 via the first network I/F 28.

The print control unit 25 comprehensively controls the printer 22. Further, the print control unit 25 performs, for example, control of switching an operation mode of the printer 22, control of print processing, changes a setting value related to printing or the network protocol, and sends a response to an inquiry of a status related to printing or the network protocol.

For example, the print control unit 25 causes the storage unit 27 to store image data, which is to be printed, received via the first network I/F 28. Further, the print control unit 25 generates print data by applying predetermined image processing on the image data read out from the storage unit 27, and executes print processing on the basis of the print data.

Further, the print control unit 25 performs control of switching the operation mode among a normal mode in which a print function as an image processing function can be executed, a first power saving mode in which power consumption is smaller than that in the normal mode, and a second power saving mode in which power consumption is smaller than that in the first power saving mode.

Figure 3:
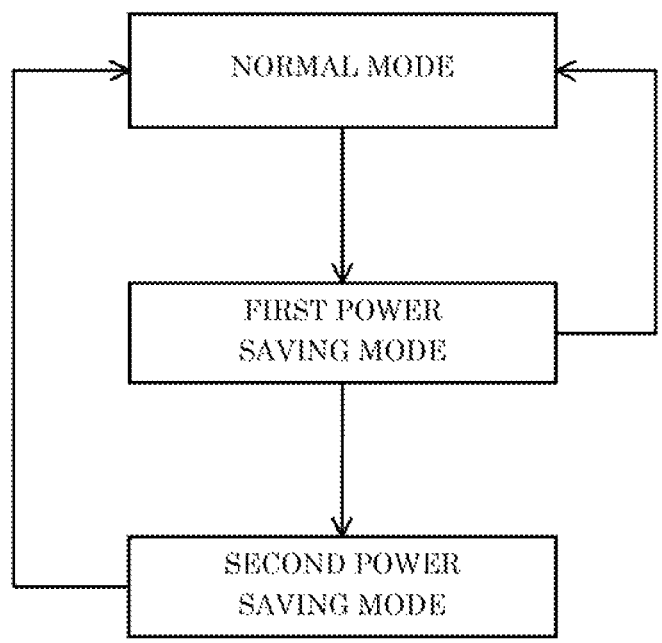
FIG. 3 is a block diagram illustrating an operation mode of a printer.

In this case, FIG. 3 shows the operation mode of the printer 22. As shown in FIG. 3, for example, when a standby state of the printer 22 in the normal mode continues for a predetermined time, the print control unit 25 switches the operation mode of the printer 22 from the normal mode to the first power saving mode. Further, when the standby state of the printer 22 in the first power saving mode further continues for a predetermined time, the print control unit 25 switches the operation mode of the printer 22 from the first power saving mode to the second power saving mode. The print control unit 25 switches the first power saving mode to the second power saving mode by stopping power supply to the first network I/F 28 of the printer 22.

Further, in the first power saving mode, the print control unit 25 monitors whether or not to have received at least requests that the printer 22 should operate in the normal mode (for example, print data requesting printing, setting data requesting the change of the setting value related to printing or the network protocol, and inquiry data requesting the status related to printing or the network protocol). When receiving these requests via the first network I/F 28, the print control unit 25 performs control of switching the first power saving mode to the normal mode as shown in FIG. 3.

On the other hand, as described below, when the return notification is sent to the printer 22 via the second network I/F 16 and the second network I/F 29, the print control unit 25 is configured to start power supply to the first network I/F 28, and as shown in FIG. 3, switch the second power saving mode to the normal mode.

On the other hand, the hub control unit 12 comprehensively controls the hub device 10. The hub control unit 12, for example, makes a setting related to switching of the first network I/F 15.

Further, when receiving the proxy response program or the various types of setting values related to printing or the network protocol from the printer 22 connected to any port of the first network I/F 15, the hub control unit 12 stores the program or the setting values in the storage unit 14. Then, the hub control unit 12 executes the proxy response program and realizes the proxy response unit 13.

It is noted that, while the hub control unit 12 can stop power supply to the first network I/F 15 of the hub device 10 when all the printers 22 connected to the hub device 10 are in the second power saving mode, the hub control unit 12 can start power supply to the first network I/F 15 of the hub device 10 when at least one of the printers 22 is switched from the second power saving mode to the normal mode. This makes it possible to further reduce power consumption of the image processing system in the second power saving mode.

Further, when the proxy response unit 13 receives first data in a case where the operation mode of the printer 22 is the second power saving mode, the hub control unit 12 is configured to start power supply to the first network I/F 15 and switch the second power saving mode to the normal mode.

In the storage unit 14, the proxy response program, the various types of setting values related to printing or the network protocol, and the like are stored.

The proxy response unit 13 is configured to, while transferring the first data to the printer 22 when receiving the first data requesting the printer 22 to perform image processing in a case where the operation mode of the printer 22 is the first power saving mode or the second power saving mode, execute predetermined processing corresponding to second data as a proxy for the printer 22 when receiving the second data requesting processing other than image processing.

That is, as a proxy for the printer 22, the proxy response unit 13 changes the setting value related to printing or the network protocol and sends a response to an inquiry of a status related to printing or the network protocol corresponding to the second data.

Specifically, when receiving a frame addressed to the printer 22, the proxy response unit 13 analyzes data content included in the frame and performs processing in accordance with the data content.

When received data is print data (first data), the proxy response unit 13 transmits the first data and a frame thereof to the printer 22 via the first network I/F 15 without processing the first data and the frame thereof.

In the first power saving mode or the second power saving mode, when the received data is setting data requesting a change of a setting value related to printing (second data), the proxy response unit 13 updates the setting value related to printing by the printer 22 stored in the storage unit 14 to a setting value included in the received second data (queuing). A setting related to printing is, for example, a default setting such as a choice between color printing or monochrome printing and a choice of print quality.

In the first power saving mode or the second power saving mode, when the received data is the inquiry data requesting a status related to printing (second data), the proxy response unit 13 refers to the setting value related to printing by the printer 22 stored in the storage unit 14, reads out a setting value in accordance with the request, and transmits the setting value to a device from which the request originates. The status related to printing includes, for example, an operation mode, the remaining amount of ink of each color, and various types of default settings.

In the first power saving mode or the second power saving mode, when the received data is setting data requesting a change of a setting value related to the network protocol (second data), the proxy response unit 13 updates a setting value related to the network of the printer 22 stored in the storage unit 14 with a setting value of the received second data.

Further, in the first power saving mode or the second power saving mode, when the received data is inquiry data requesting a status related to the network protocol (second data), the proxy response unit 13 refers to a setting value related to the network protocol of the printer 22 stored in the storage unit 14, reads out a setting value in accordance with the request, and transmits the setting value to a device from which the request originates.

In addition, it is preferable that, for example, a plurality of protocols are stored in the storage unit 14 according to various image processing apparatuses such as a multifunction peripheral and a facsimile apparatus, and the proxy response unit 13 can send a proxy response, in response to each image processing apparatus connected to the hub device 10. Further, it is preferable that a rule of queuing in the storage unit 14 can be changed appropriately according to a setting of a user. For example, a priority of data to be stored in the storage unit 14 may be changed appropriately according to the setting of the user.

Further, when receiving the first data in a case where the operation mode of the printer 22 is the second power saving mode, the proxy response unit 13 is configured to send the return notification to the printer 22 via the second network I/F 16 and the second network I/F 29 before transferring the first data to the printer 22.

It is noted that, each constituent element described above is one example in which the configuration of the printer 22 and the hub device 10 is classified according to a main processing content so that the configuration is understood easily. The configuration of the printer 22 and the hub device 10 can also be classified into even more constituent elements according to the processing content. Further, it is also possible that one constituent element executes even more processing. Further, processing by each constituent element may be executed by a piece of hardware or a plurality of pieces of hardware.

Figure 4:
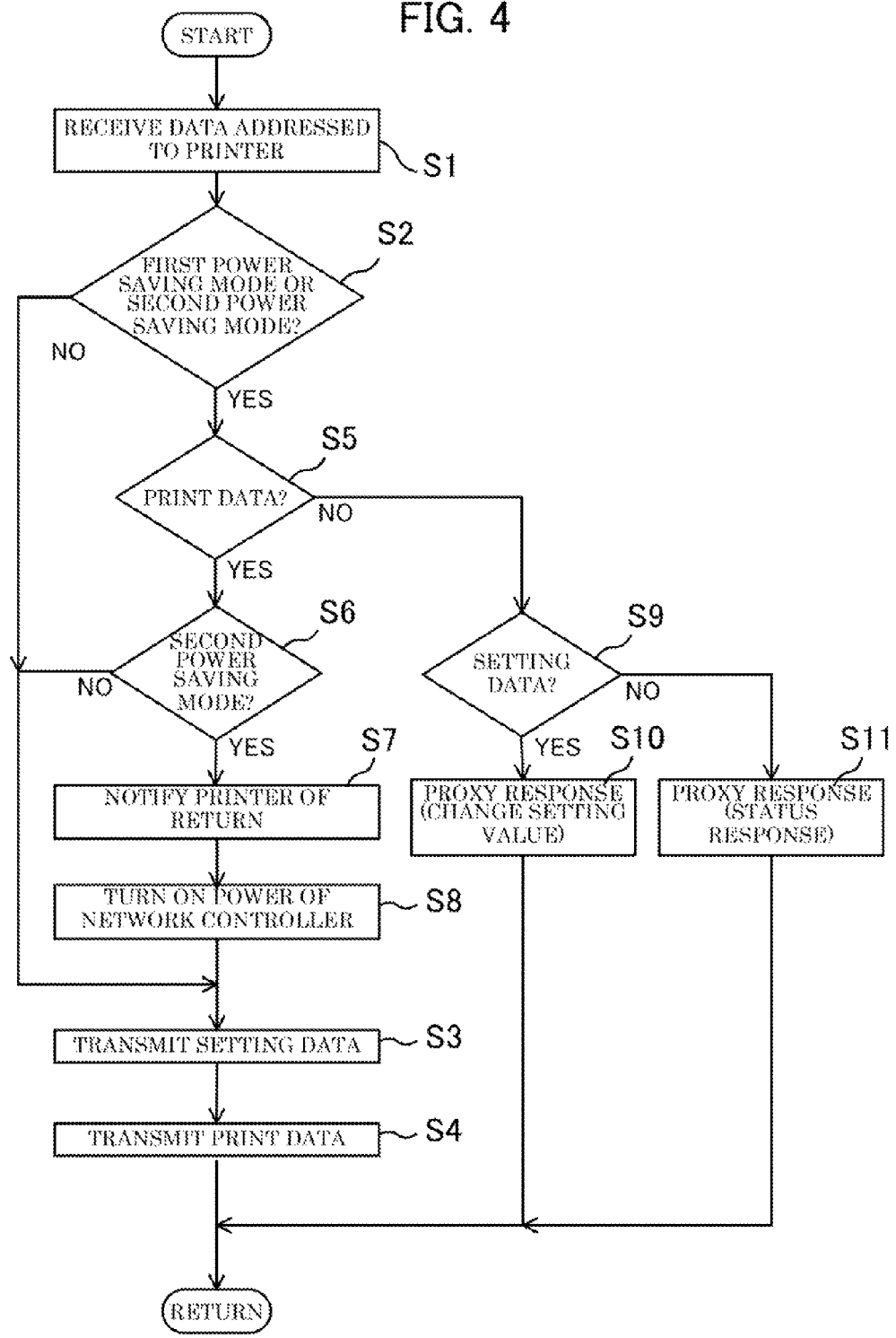
FIG. 4 is a flowchart showing proxy response processing by an image processing system.

Next, characteristic processing by the image processing system 1 will be described. FIG. 4 is a flowchart showing proxy response processing by the image processing system 1.

As shown in FIG. 4, first, in step S1, the proxy response unit 13 of the hub device 10 receives and analyzes data addressed to the printer 22. That is, the proxy response unit 13 receives the frame addressed to the printer 22 transferred from the first network I/F 15. Then, the proxy response unit 13 analyzes whether the data content included in the frame is the first data (the print data) or the second data (the setting data requesting the change of the setting value related to printing or the network protocol, the inquiry data requesting the status related to printing or the network protocol, and the like). Then, the flow proceeds to step S2.

In step S2, the proxy response unit 13 determines whether the operation mode of the printer 22 is the first power saving mode or the second power saving mode. As a result, when the operation mode is the normal mode, the proxy response unit 13 determines as "NO", and the flow proceeds to step S3.

In step S3, the proxy response unit 13 transmits the setting data to the printer 22. That is, the proxy response unit 13 transmits, to the printer 22, the setting data including the setting value related to printing or the network protocol, stored in the storage unit 14.

It is noted that, when receiving the setting data including the setting value related to printing or the network protocol (the second data) via the first network I/F 28, the print control unit 25 of the printer 22 updates, with the setting value, the various types of setting values stored in the storage unit 27 and applies the updated setting values.

Thereafter, in step S4, the proxy response unit 13 transmits the print data to the printer 22. That is, the proxy response unit 13 transmits the frame received in step S1 to the printer 22 via the first network I/F 15 without processing the frame. It is noted that, when receiving the print data via the first network I/F 28, the print control unit 25 of the printer 22 executes print processing on the basis of the print data.

On the other hand, in step S2 described above, when it is determined as "YES" since the operation mode of the printer 22 is the first power saving mode or the second power saving mode, the flow proceeds to step S5. In step S5, the proxy response unit 13 determines whether or not the received data analyzed in step S1 is the first data (the print data). As a result, when the received data is the first data (the print data), the proxy response unit 13 determines as "YES", and the flow proceeds to step S6.

In step S6, the proxy response unit 13 determines whether or not the operation mode of the printer 22 is the second power saving mode. As a result, when the operation mode is the second power saving mode, it is determined as "YES", and the flow proceeds to step S7.

In step S7, the hub control unit 12 of the hub device 10 sends the return notification to the printer 22 via the second network I/F 16 and the second network I/F 29. Thereafter, the flow proceeds to step S8.

In step S8, the print control unit 25 of the printer 22 to which the return notification is sent, supplies power to the first network I/F 28. At the time, when the power supply to the first network I/F 15 in the hub device 10 is stopped, the power supply is restarted. Then, a state is made in which communication by the first network I/F 15 and the first network I/F 28 is possible. Thereby, the operation mode is switched from the second power saving mode to the normal mode.

Thereafter, in step S3, the proxy response unit 13 transmits, to the printer 22, the setting data including the setting value related to printing or the network protocol, stored in the storage unit 14. Subsequently, in step S4, the proxy response unit 13 transmits the frame received in step S1 to the printer 22 via the first network I/F 15. Then, when receiving the print data via the first network I/F 28, the print control unit 25 of the printer 22 executes print processing on the basis of the print data.

On the other hand, in step S5 described above, when the proxy response unit 13 determines as "NO" since the received data analyzed in step S1 is not the first data (the print data), the flow proceeds to step S9.

In step S9, it is determined whether or not the received data is setting data of the second data. As a result, when the proxy response unit 13 determines as "YES" since the received data is the setting data, the flow proceeds to step S10. Then, in step S10, the proxy response unit 13 sends the proxy response (changes the setting value). That is, when the setting data received in step S1 is data requesting the change of the setting value related to printing, the proxy response unit 13 changes the setting value related to printing stored in the storage unit 14 with the setting value of the received data.

Further, when the setting data received in step S1 is data requesting the change of the setting value related to the network, the proxy response unit 13 updates the setting value related to the network stored in the storage unit 14 with the setting value of the received data.

On the other hand, in step S9, when the proxy response unit 13 determines as "NO" since the received data is the inquiry data requesting the status related to printing, the flow proceeds to step S11. Then, in step S11, the proxy response unit 13 sends the proxy response (a status response). That is, when the data received in step S1 is the inquiry data requesting the status related to printing, the proxy response unit 13 refers to the setting value related to printing stored in the storage unit 14, reads out a setting value in accordance with the request, and transmits the setting value to a device from which the request originates.

Further, when the data received in step S1 is the inquiry data requesting the status related to the network, the proxy response unit 13 refers to the setting value related to the network stored in the storage unit 14, reads out a setting value in accordance with the request, and transmits the setting value to a device from which the request originates.

It is noted that, each processing unit of FIG. 4 is one example in which processing is divided according to a main processing content so that processing by the printer 22 and the hub device 10 is understood easily. The processing by the printer 22 and the hub device 10 can also be divided into even more processing units according to the processing content. Further, it is also possible to divide the processing so that one processing unit includes even more processing.

Figure 5:
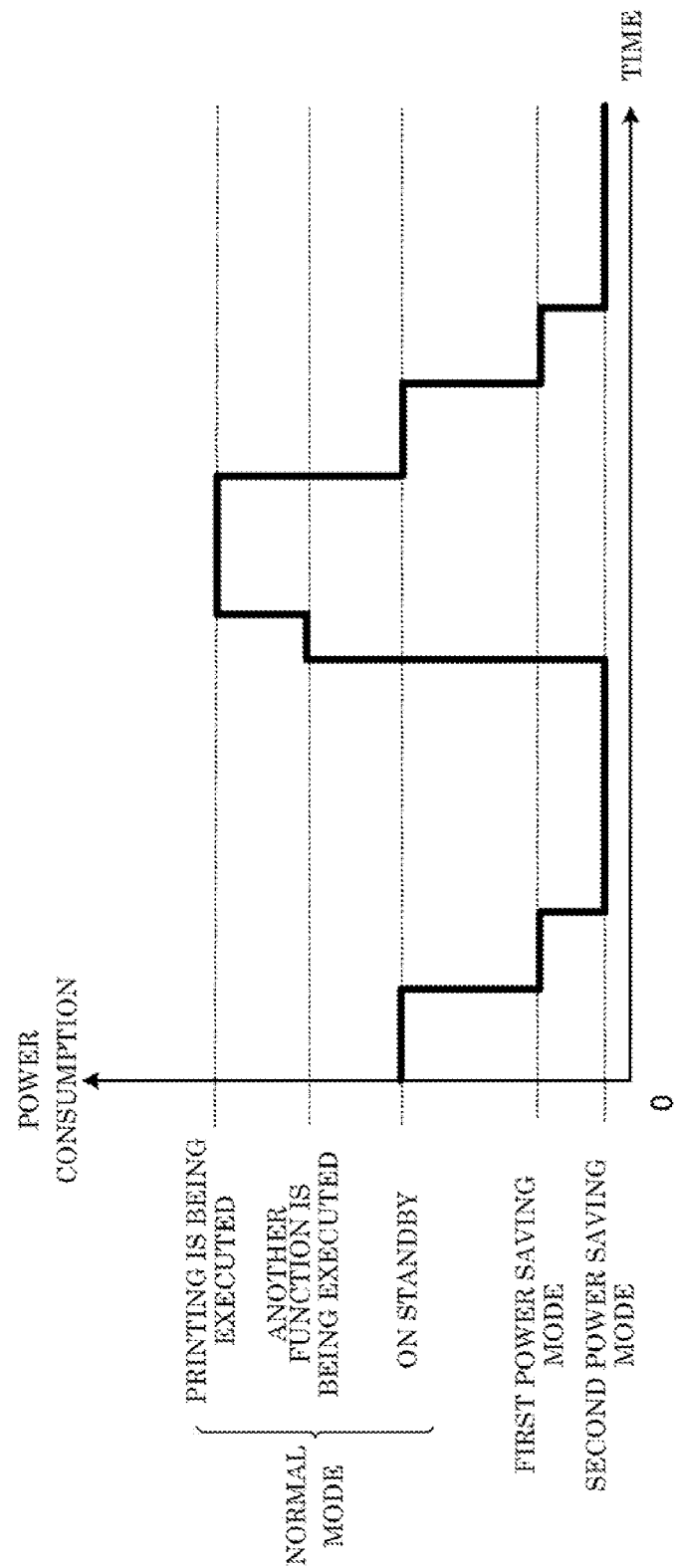
FIG. 5 is a graph showing a change in power consumption of a printer controller.

Therefore, according to the present embodiment, it is possible to further reduce power consumed by the image processing system 1. In this case, FIG. 5 shows a change in power consumption of the printer controller 23. As shown in FIG. 5, the operation mode of the printer 22 is switched from the normal mode to the first power saving mode by the print control unit 25, thereby making it possible to reduce the power consumption of the printer 22. Further, since power supply to the first network I/F 28 in the printer 22 is stopped by switching the operation mode from the first power saving mode to the second power saving mode, the power consumption of the printer 22 can be further reduced.

In a case where the operation mode is the first power saving mode or the second power saving mode, the proxy response unit 13, while transferring the first data to the printer 22 when receiving the first data requesting the printer 22 to perform print processing, sends the proxy response when receiving the second data other than the first data.

In particular, when the proxy response unit 13 receives the first data in a case where the operation mode is the second power saving mode, the proxy response unit 13 can notify the printer 22 of a return via the second network I/F 16 and the second network I/F 29 as communication means separate from the wired LAN before transferring the first data to the printer 22. Therefore, the print control unit 25 of the printer 22 to which the return is notified, can start the power supply to the first network I/F 28 of the printer 22 and switch the second power saving mode to the normal mode.

Thus, in the image processing system 1, the printer 22 is returned to the normal mode from the second power saving mode in which the power supply to the first network I/F 28 is stopped by the second network I/F 16 and the second network I/F 29 in which power consumption is smaller than that in the first network I/F 28 connected to the wired LAN, and thus, power consumed by the image processing system 1 can be further reduced.

Further, when the print control unit 25 is configured to switch the first power saving mode to the second power saving mode in a case where the standby state of the printer 22 in the first power saving mode continues for a predetermined time, it is possible to switch the operation mode to the second power saving mode when the standby state in the first power saving mode continues for a predetermined time even when a user does not perform an extra operation.

It is noted that, for example, the print control unit 25 can be configured to monitor whether or not the operation panel 24 receives an instruction by a user to switch the normal mode to the first power saving mode or the second power saving mode.

In such a case, in the first power saving mode, the print control unit 25 monitors whether or not to have received at least requests that the printer 22 should operate in the normal mode. When receiving these requests via the operation panel 24, the print control unit 25 performs control of switching the first power saving mode to the normal mode. Therefore, it is possible to switch the first power saving mode to the second power saving mode at a timing intended by a user.

Further, the print control unit 25 may be configured so as not to execute switching from the first power saving mode to the second power saving mode on the basis of a setting that is input by the user.

Thereby, switching from the first power saving mode to the second power saving mode can be prohibited according to intention of the user, and thus, the user can utilize the second power saving mode more appropriately.

Further, the print control unit 25 may be configured so as to limit switching from the first power saving mode to the second power saving mode according to a time zone in which the printer 22 is used.

Thereby, it is possible to prevent execution of switching to the second power saving mode in a predetermined time zone in which, for example, the printer 22 is frequently used. This makes it possible to avoid a situation in which a waiting time is generated for the user until when the printer 22 in the second power saving mode can communicate with the hub device 10 in such a time zone.

As described above, the art of the present disclosure is useful for an image processing system having a network relay device and an image processing apparatus.

The invention claimed is:

1. An image processing system, comprising:
a network relay device; and
an image processing apparatus having a network controller connected to the network relay device via a wired LAN, wherein,
the image processing apparatus has a control unit that performs control of switching an operation mode among a normal mode in which an image processing function can be executed, a first power saving mode in which power consumption is smaller than that in the normal mode, and a second power saving mode in which power consumption is smaller than that in the first power saving mode,
the network relay device has a proxy response unit that, while transferring first data to the image processing apparatus when receiving the first data requesting the image processing apparatus to perform image processing, in a case where an operation mode of the image processing apparatus is the first power saving mode or the second power saving mode, executes predetermined processing corresponding to second data as a proxy for the image processing apparatus when receiving the second data requesting processing other than the image processing,
the image processing apparatus and the network relay device are configured to be communicable with each other by communication means in which power consumption is smaller than that in the network controller of the image processing apparatus,
the proxy response unit is configured to send a return notification to the image processing apparatus via the communication means before transferring the first data to the image processing apparatus when receiving the first data in a case where an operation mode of the image processing apparatus is the second power saving mode, and
the control unit is configured to, while switching the first power saving mode to the second power saving mode by stopping power supply to the network controller of the image processing apparatus, start power supply to the network controller of the image processing apparatus to switch the second power saving mode to the normal mode when the return notification is sent.

2. The image processing system according to claim 1, wherein
the control unit is configured to switch the first power saving mode to the second power saving mode when a standby state of the image processing apparatus in the first power saving mode continues for a predetermined time.

3. The image processing system according to claim 1, wherein
the control unit is configured to limit switching from the first power saving mode to the second power saving mode according to a time zone in which the image processing apparatus is used.

4. The image processing system according to claim 1, wherein the control unit is configured so as not to switch from the first power saving mode to the second power saving mode on the basis of a setting that is input by a user.

5. An image processing apparatus having a network controller connected to the network relay device via a wired LAN, comprising a control unit that performs control of switching an operation mode among a normal mode in which an image processing function can be executed, a first power saving mode in which power consumption is smaller than that in the normal mode, and a second power saving mode in which power consumption is smaller than that in the first power saving mode, the image processing apparatus is configured to be communicable with the network relay device by communication means in which power consumption is smaller than that in the network controller the network relay device has a proxy response unit that, while transferring first data to the image processing apparatus when receiving the first data requesting the image processing apparatus to perform image processing, in a case where an operation mode of the image processing apparatus is the first power saving mode or the second power saving mode, executes predetermined processing corresponding to second data as a proxy for the image processing apparatus when receiving the second data requesting processing other than the image processing, the proxy response unit is configured to send a return notification to the image processing apparatus via the communication means before transferring the first data to the image processing apparatus when receiving the first data in a case where an operation mode of the image processing apparatus is the second power saving mode, and the control unit is configured to, while switching the first power saving mode to the second power saving mode by stopping power supply to the network controller of the image processing apparatus, start power supply to the network controller of the image processing apparatus to switch the second power saving mode to the normal mode when the return notification is sent.

\* \* \* \* \*